United States Patent
Jeon

(10) Patent No.: US 9,643,383 B2
(45) Date of Patent: May 9, 2017

(54) CAR INTERNET SHEET USING HYGIENE PRODUCT AND MANUFACTURING METHOD THEREOF

(71) Applicant: Young-Chul Jeon, Pyeongtaek-si (KR)

(72) Inventor: Young-Chul Jeon, Pyeongtaek-si (KR)

( * ) Notice: Subject to any disclaimer, the term of this patent is extended or adjusted under 35 U.S.C. 154(b) by 308 days.

(21) Appl. No.: 14/325,706

(22) Filed: Jul. 8, 2014

(65) Prior Publication Data

US 2015/0093567 A1 Apr. 2, 2015
US 2017/0066217 A9 Mar. 9, 2017

(30) Foreign Application Priority Data

Sep. 30, 2013 (KR) .................. 10-2013-0116528

(51) Int. Cl.
*B32B 5/16* (2006.01)
*D04H 1/4274* (2012.01)
(Continued)

(52) U.S. Cl.
CPC ............... *B32B 5/16* (2013.01); *B29B 13/00* (2013.01); *B32B 5/022* (2013.01); *B32B 27/065* (2013.01); *B32B 27/08* (2013.01); *B32B 27/10* (2013.01); *B32B 27/12* (2013.01); *B32B 27/20* (2013.01); *B32B 27/22* (2013.01); *B32B 27/302* (2013.01); *B32B 27/304* (2013.01); *B32B 27/32* (2013.01); *B32B 27/34* (2013.01); *D04H 1/4274* (2013.01); *B29B 2013/002* (2013.01); *B29D 99/001* (2013.01); *B29K 2101/12* (2013.01); *B29K 2105/0038* (2013.01); *B29K 2105/26* (2013.01); *B32B 2250/03* (2013.01); *B32B 2250/40* (2013.01); *B32B 2266/025* (2013.01); *B32B 2272/00* (2013.01); *B32B 2307/54* (2013.01); *B32B 2307/558* (2013.01); *B32B 2307/726* (2013.01); *B32B 2605/003* (2013.01); *B60R 13/02* (2013.01); *Y10T 428/251* (2015.01)

(58) Field of Classification Search
CPC . B32B 5/16; B32B 27/12; B32B 12/00; A61F 5/44
See application file for complete search history.

(56) References Cited

FOREIGN PATENT DOCUMENTS

JP 2011051566 A * 3/2011
KR 10-0437869 B1 6/2004
(Continued)

*Primary Examiner* — Mark Kaucher
(74) *Attorney, Agent, or Firm* — Novick, Kim & Lee, PLLC; Jae Youn Kim

(57) ABSTRACT

Disclosed are a car interior sheet manufactured by using a defective product (defective hygiene product) among hygiene products such as tissues or diapers including wet-strength paper made of pulp including plastic or super absorbent polymer (SAP). The car interior sheet is manufactured by attaching surface layers such as a nonwoven fabric to both surfaces of a base layer thereof including 30-50 weight % of a pulverized material, 5-15 weight % of additives, and 30-50 weight % of thermoplastic resin. The car interior sheet represents a low manufacturing cost, and does not generate environmental hazardous materials. The car interior sheet represents superior impact resistance at high and low temperatures, has a superior moisture absorption rate due to the SAP, so that the car interior sheet is rapidly dried after the moisture has been absorbed.

5 Claims, 1 Drawing Sheet

(51) Int. Cl.
*B29B 13/00* (2006.01)
*B32B 27/12* (2006.01)
*B32B 5/02* (2006.01)
*B32B 27/06* (2006.01)
*B32B 27/08* (2006.01)
*B32B 27/10* (2006.01)
*B32B 27/20* (2006.01)
*B32B 27/22* (2006.01)
*B32B 27/30* (2006.01)
*B32B 27/32* (2006.01)
*B32B 27/34* (2006.01)
*B60R 13/02* (2006.01)
*B29D 99/00* (2010.01)
*B29K 101/12* (2006.01)
*B29K 105/00* (2006.01)
*B29K 105/26* (2006.01)

(56) References Cited

FOREIGN PATENT DOCUMENTS

| KR | 10-0607405 | B1 | 8/2006 |
| KR | 10-1069903 | B1 | 10/2011 |
| KR | 10-1254496 | B1 | 4/2013 |

* cited by examiner

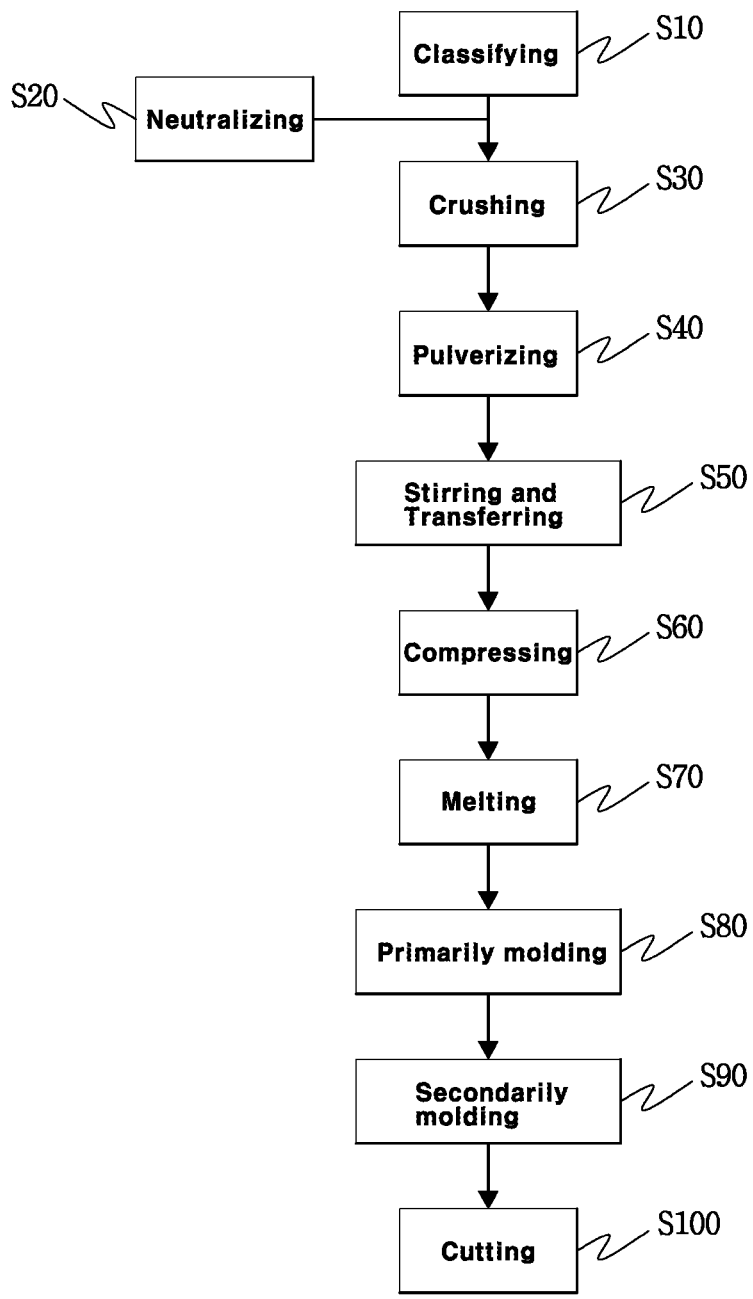

CAR INTERNET SHEET USING HYGIENE PRODUCT AND MANUFACTURING METHOD THEREOF

BACKGROUND OF THE INVENTION

1. Field of the Invention

The present invention relates to a car interior sheet manufactured by using a defective product (defective hygiene product), which is generated in the manufacturing process of hygiene products, and a hygiene product (waste hygiene product), which is wasted after use, among hygiene products such as tissues or diapers including wet-strength paper made of pulp including plastic or super absorbent polymer (SAP). In more particular, the present invention relates to a car interior sheet using a hygiene product, which is manufactured by attaching surface layers such as a nonwoven fabric to both surfaces of a base layer of the car interior sheet including 30 weight % to 50 weight % of a pulverized material, which is obtained by pulverizing a hygiene product, 5 weight % to 15 weight % of additives, and 30 weight % to 50 weight % of thermoplastic resin, and a manufacturing method thereof.

2. Description of the Related Art

In general, for example, a car interior material, that is, a car interior sheet may include a head liner, a door trim, a rear shelf, a sunroof cover, a package tray trim, a luggage cover, an engine cover, a trunk mat, a car mat, and a bonnet.

The car interior sheet includes a plurality of laminates in which surface and base layers are laminated. In detail, the base layer includes polypropylene (PP), polyethylene (PE), acrylonitrile butadiene styrene copolymer (ABS) resin, wood fiber, wood stock or resin felt. The surface layer includes a polyvinylchloride (PVC) film, polyethylene foam, or nonwoven paper. The car interior sheet is formed by attaching the surface layer to both surfaces of the base layer.

Most car interior sheets include foams. However, most foams employ petrochemicals, which are environment hazardous substances that cannot be recycled, as main source materials. The materials cannot be recycled and elate toxic materials by heat when the materials are combusted to contaminate soil or degrade water quality, thereby causing environmental pollution. In addition, the car interior sheet generates a large amount of toxic chemical ingredients, which cause harm to a human body, from a product in the manufacturing process to a complete product. Even if time elapses, the toxic chemical ingredients are not removed, so that health problems may be caused to a worker or a user.

Recently, in order to solve the problem, the car interior sheet has been manufactured by using natural materials such as wood flour, which is formed by pulverizing wood, or straw. However, when the natural materials are used, the natural materials have weak stiffness so that physical properties such as tensile strength or flexural rigidity may be degraded. In addition, when the car interior sheet is manufactured by introducing a large amount of natural materials in order to solve the problem, the thickness and the weight of the car interior sheet are increased, so that the fuel efficiency of a car is degraded. Accordingly, the work efficiency and the manufacturing cost may be increased.

In addition, the car interior sheet must have a fine appearance and represent superior performance in thermal insulation, sound insulation, sound absorption, cushioning, and formability in which a car can be easily molded according to the structural changes of the car resulting from the variation of the complex interior structure of the car and a car model.

Accordingly, continuous studies and researches are required on a car interior sheet to overcome the above problems and represent superior performance.

As related arts, there are Korea Patent Registration Nos. 10-0607405, 10-1254496, 10-0437869, and 10-1069903.

SUMMARY OF THE INVENTION

The present invention is made in order to overcome the problems occurring in the related art, and an object of the present invention is provide solutions to problems that a car interior sheet according to the related art manufactured by using petrochemicals as main source materials generates a large amount of chemical ingredients harmful to an environment and a human body, and a car interior sheet manufactured by using natural materials as main source materials is increased in thickness and weight to degrade the fuel efficiency and to increase the work efficiency and the manufacturing cost because a large amount of natural materials representing weak stiffness are introduced in order to manufacture the car interior sheet.

In order to accomplish the above object, according to one aspect of the present invention, there is provided a car interior sheet a base layer, and surface layers attached to both surfaces of the base layer. The base layer includes 30-50 weight % of a pulverized material of the hygiene product, which includes 20-35 weight part of pulp, 20-35 weight parts of super absorbent polymer (SAP), and 30-35 weight parts of PP and PE, 5-15 weight % of additives, 1-5 weight % of illite, and 30-50 weight % of the thermoplastic resin.

According to another aspect of the present invention, there is provided a method of manufacturing a car interior sheet by using a hygiene product. The method includes classifying hygiene products having a pulp material including plastic and super absorbent polymer (SAP) into a defective hygiene product and a waste hygiene product, neutralizing the waste hygiene product by performing an absorption inhibition treatment for the waste hygiene product, and cleaning and drying the waste hygiene product, crushing the hygiene product to predetermined size, pulverizing the crushed hygiene product in a form of fiber by a pulverizer, transferring the pulverized hygiene product, illite powders, additives, and thermoplastic resin together to a screw conveyer while stirring and mixing the pulverized hygiene product, the illite powders, the additives, and the thermoplastic resin together, compressing the pulverized hygiene product, the illite powders, the additives, and the thermoplastic resin by a compressor after the transferring, stirring, and mixing of the pulverized hygiene product, illite powders, additives, and thermoplastic resin, melting the materials, which has been compressed, by a melting unit and mixing the materials, primarily extrusion-molding the melted mixture by using a T-DIE extruder, performing a secondary molding process of forming a base layer of the car interior sheet by pressing the primarily-molded material after passing the primarily-molded material through a calendar, and thermally bonding a surface layer onto both surfaces of the molded base layer and cutting the result.

As described above, according to the car interior sheet manufactured by using a hygiene product and the manufacturing method thereof, since the car interior sheet is manufactured by crushing the hygiene product, the manufacturing cost can be reduced. In addition, since the car interior sheet does not generate environmental hazardous materials including four heavy metals, the car interior sheet is eco-friendly. The car interior sheet represents superior impact resistance at high and low temperatures, has a superior moisture absorption rate due to the SAP, so that the car interior sheet can be rapidly dried after the moisture has been absorbed, and has a low dimensional change, so that the deformation of the car interior sheet cannot be easily deformed.

BRIEF DESCRIPTION OF THE DRAWINGS

FIG. 1 is a flowchart showing a method of manufacturing a car interior sheet according to an exemplary embodiment of the present invention.

DETAILED DESCRIPTION OF THE INVENTION

In general, a car interior sheet includes a plurality of laminates including a base layer and a surface layer attached to both surfaces of the base layer. A car interior sheet may include a head liner, a door trim, a rear shelf, a sunroof cover, a package tray trim, a luggage cover, an engine cover, a trunk mat, a car mat, and a bonnet.

The present invention relates to a car interior sheet, which is manufactured by using a defective product (defective hygiene product), which is generated in the manufacturing process of hygiene products, and a hygiene product (waste hygiene product), which is wasted after use, among hygiene products such as tissues or diapers and sanitary napkins including wet-strength paper made of pulp including plastic or super absorbent polymer (SAP), and a manufacturing method thereof. In the following description, the terms "defective hygiene product" and "waste hygiene product" are named only for the distinction therebetween, and collectively named "hygiene product".

In detail, the car interior sheet according to the present invention includes a base layer and a surface layer attached to both surfaces of the base layer. The base layer includes 30-50 weight % of pulverized material of a hygiene product, 5-15 weight % of additives, and 30-50 weight % of the thermoplastic resin. The pulverized material of the hygiene product includes 20-35 weight part of pulp, 20-35 weight part of super absorbent polymer (SAP), and 30-50 weight part of PP and PE based on 100 weight part of the pulverized material of the hygiene product.

Most hygiene products used according to the present invention are disposably manufactured, and divided into defective hygiene products made in the manufacturing process and waste hygiene products discharged after use. In the case of the defect hygiene products, there is no appropriate treatment scheme except for an incineration scheme. In addition, since the defect hygiene products do not contain foreign substances, there is no process prior to a pulverizing work. However, since the waste hygiene product contains foreign substances such as refuses, the waste hygiene product requires a process of removing or separating the foreign substances before the pulverizing work is performed. In this case, the process of removing or separating the foreign substances employs a scheme based on water and a treatment scheme in a dry state without water.

According to the scheme based on water in the process of removing or separating the foreign substances from the waste hygiene product, the waste hygiene product is subject to absorption inhibition treatment so that SAP contained in the waste hygiene product is prevented from absorbing water. In general, the absorption inhibition treatment is preferably by processing an absorption inhibitor mixture to inhibit the absorbent property of the SAP including synthetic resin-based materials such as starch-based materials, cellulose-based materials, polyacrylic acid salt-based materials, polyvinyl alcohol-based materials, polyacrylamide-based materials, and polyoxyethylene-based materials. In this case, although a typical absorption inhibitor mixture is generally used in an absorption inhibition treatment, the absorption inhibitor mixture according to the present invention includes the mixture of water and bittern mixed at a predetermined ratio therebetween, or the mixture of 70-90 weight % of water and 30-10 weight % of calcium chloride.

In detail, regarding the absorption inhibitor having water and bittern mixed at a predetermined ratio in the absorption inhibitor mixture, the bittern lowers the absorbent property of SAP having several hundred times greater than the weight of the SAP, thereby inhibiting the SAP from absorbing the water mixed together with the waste hygiene product. In addition, preferably, the salinity of the bittern is at least 20%. The ratio between water and the bittern can be freely adjusted by those skilled in the art depending on the adjustment of the time for the absorption inhibition treatment resulting from the ratio of the bittern serving as an absorption inhibitor.

Further, regarding the absorption inhibitor mixture having the water and calcium chloride mixed at a predetermined ratio, the calcium chloride to decompose the SAP (which is polymer) into low molecular weight substances serves as an absorption inhibitor to decompose a portion of the SAP contained in the waste hygiene product, so that the absorbent property of the SAP can be lowered.

In this case, if the content of calcium chloride contained in the absorption inhibitor mixture is less than 10 weight %, absorption inhibition ability for the SAP is weakened, and the waste hygiene product absorbs an excessive amount of water due to the SAP in the absorption inhibition treatment. If the content of calcium chloride contained in the absorption inhibitor mixture is more than 30 weight %, the concentration of calcium chloride is excessively increased, so that an excessive amount of calcium chloride is contained in a pulverized material after the pulverizing work of the waste hygiene product. Accordingly, an absorption inhibitor mixture containing 70-90 weight % of water and 30-10 weight % of calcium chloride is preferably used.

In addition, cleaning treatment is performed to clean the waste hygiene product after the absorption inhibition treatment has been performed. The cleaning treatment is to dispose of solid sewage that may be attached to the waste hygiene product. Conventional various cleaning treatments may be used if water is applied to the waste hygiene product including absorption-inhibited SAP to remove the sewage. In addition, according to the determination of those skilled in the art, the cleaning treatment may be performed before the absorption inhibition treatment is performed. Those skilled in the art may naturally understand that the cleaning treatment is performed in a dry state without water if the cleaning treatment is performed before the absorption inhibition treatment is performed. In addition, none of the cleaning treatment and the absorption inhibition treatment may be performed in the case of the hygiene product, such as a defective hygiene product, without solid sewage.

Then, after pulverizing the hygiene product in the form of fine fiber, the pulverized hygiene product is mixed with additives and thermoplastic resin without an organic solvent or a foaming agent, the mixture is melted, and an extrusion molding process is performed with respect to the melted mixture to manufacture the car interior sheet. Accordingly, the eco-friendly product can be manufactured.

In general, most foaming agents used in a car interior sheet employ petrochemicals, which are environmental hazardous substances that cannot be recycled, as main source materials. The materials cannot be recycled, and elute toxic materials by heat when the materials are combusted to contaminate soil or degrade water quality, thereby causing environmental pollution. In addition, the car interior sheet generates a large amount of toxic chemical ingredients, which cause harm to a human body, from a product in the manufacturing process to a complete product. Even if time elapses, the toxic chemical ingredients are not removed, so that health problems may be caused to a worker or a user.

However, the SAP contained in the pulverized material of the hygiene product according to the present invention includes a polymer having a 3-D network structure and multiple hydrophilic groups. Since the SAP, which is not dissolved in water while absorbing a large amount of water, has a space in the 3-D network structure, the SAP makes an effect of maintaining the thickness of the car interior sheet and of reducing the specific gravity of the SAP.

In addition, the SAP is called "SAM (Super Absorbency Material) or AGM (Absorbent Gel Material). The SAP has a hydrophilic property in a network structure having a net form. Further, the SAP can absorb water in weight about 1000 times greater than that of the SAP. Once the SAP absorbs water, even if a pressure is applied to the water, the SAP does not discharge the water. On the contrary, although pulp rapidly absorbs a large amount of water, if the pulp absorbs a predetermined amount of water, the pulp discharges water by even a weak pressure.

In other words, according to the present invention, the car interior sheet is manufactured by using the mixture of the pulp and the SAP. Accordingly, the car interior sheet absorbs moisture to remove moisture existing in the car in summer since air contains a large amount of moisture. In winter, moisture absorbed in the SAP is evaporated into the dry air through the pulp, so that the interior of the car can be moisturized.

Further, generally, the pulp constituting the pulverized material of the hygiene product according to the present invention is natural pulp constituting the hygiene product. The pulp, which is the assembly of cellulose fibers obtained from woods or other textile plants through a mechanical scheme, a chemical scheme, or other intermediate schemes, instantaneously absorbs water and represents superior air permeability to evaporate water with superior evaporation capacity. Accordingly, the pulp is preferably mixed with the SAP. Those skilled in the art may directly mix the natural pulp with the SAP without pulverizing the hygiene product for use.

In this case, if the content of the pulverized material of the hygiene product contained in the base layer is less than 30 weight %, the composition ratio between the pulp and the SAP has a slight value, so that the content of the thermoplastic resin is increased, so the car interior sheet, which is finally molded, is increased in moisture absorption and a size change rate. If the content of the pulverized material of the hygiene product contained in the base layer is more than 50 weight %, the thickness and the weight of the car interior sheet may be increased. Accordingly, the content of the pulverized of the hygiene product may be in the range of 30-50 weight %.

Further, the car interior sheet according to the present invention further includes illite in the range of 1-5 weight %. Preferably, the car interior sheet includes illite in the form of powders having an average particle size of 1000 meshes.

In general, the illite self-generates anions, and has superior absorption and decomposition properties for radioactive matter, and superior absorption, deodorization, and decomposition properties for various heavy metals, and toxic gases. In addition, the illite has a property of making cytostatic action with respect to bacteria and fungi to represent superior sterilization and to remove bed smell, represents a superior thermal stability due to low thermal conductivity resulting from heat storage and heat insulation, and has superior elasticity and a superior adhesive property without being lumpy.

In other words, the car interior sheet manufactured by mixing illite powders can significantly maintain a proper amount of moisture, and makes superior moisturizing action and a superior sun block effect, so that the interior of a vehicle can be maintained under a fresh environment. In addition, the illite minimizes the deformation of the car interior sheet by ultraviolet ray.

In this case, if the content of illite contained in the base layer is less than 1%, the composition ratio represents a slight value, so that the moisture maintaining effect or the sun block effect is slightly made. If the content of the illite contained in the base layer is more than 5 weight %, the contents of other composites are slight, so that the performance of the car interior sheet may be degraded. Accordingly, the content of the illite is preferably in the range of 1 weight % to 5 weight %.

According to the present invention, the additives include one of waxes, plasticizers, and cooking oils, and added with the content of 5-15 weight %. The wax includes at least one of polyethylene (PE) wax, polypropylene (PP) wax, amid wax, and Derurex wax and allows the base layer of the car interior sheet to represent superior lubricity in a solid state. Accordingly, the surface layer can be easily attached to the base layer.

In addition, the wax preferably includes the PE wax, which is generally used, in order to reduce the manufacturing cost. However, more preferably, the wax includes one of the PE wax or the Derurex wax or the mixture of the PE wax and the Derurex wax.

In addition, the plasticizer according to the present invention includes at least dioctyl phthalate (DOP), diisononyl phthalate (DINP), dioctyl adipate (DOA), trioctyl trimellitate (TOTM), and tricresyl phosphate (TCP). The plasticizer has a property allowing PE, PP, and thermoplastic resin to be easily molded by applying flexibility and elasticity to the PE, PP, and thermoplastic resin. Accordingly, the plasticizer preferably includes the mixture of at least two of the above materials to represent superior heat resistance, volatility, stability, and flammability.

The cooking oil according to the present invention is used as a bonding agent and added to the mixture of the synthetic resin and the pulp through a spraying scheme so that the synthetic resin can be effectively mixed with the pulp. In addition, a plurality of cooking oils are provided at equal intervals along a transfer direction of the mixture, or uniformly distributed and sprayed in a spiral direction at equal divided points of the circumference of a cylinder. Further, in order to reduce the cost, waste cooking oil is preferably used.

If the content of the additives is less than 5 weight %, the lubricity of the surface is degraded, the molding is difficult, and the mixture of the synthetic resin and the pulp cannot be effectively made. If the content of the additives is more than 15 weight %, the content of other composites may be slight, and the performance of the car interior sheet may be degraded. Accordingly, the content of the additives is preferably in the range of 5-15 weight %.

The thermoplastic resin includes at least one of poly vinyl chloride (PVC) resin, polystyrene (PS) resin, polyethylene (PE) resin, polypropylene (PP) resin, acrylic resin, and polyamide resin. The thermoplastic resin is further added to the PE and the PP of the pulverized material of the hygiene product, so that tensile strength or flexural rigidity of the car interior sheet can be more enhanced.

Most preferably, the thermoplastic resin includes at least one of PE resin and PP resin the same as PE and PP contained in the pulverized material of the hygiene product. Accordingly, the heterogeneity with the PE and the PP contained in the pulverized material of the hygiene product can be reduced, so that the mixing can be easily achieved.

In this case, if the content of the thermoplastic resin contained in the base layer is less than 30 weight %, the ratio of the pulverized material of the hygiene product is increased, so that the car interior sheet is increased in thickness and weight. On the contrary, if the content of the thermoplastic resin contained in the base layer is more than 50 weight %, the ratio of the pulverized material of the hygiene product is lowered, so that the composition ratio of the pulp and the SAP represents a low value. Accordingly, the moisture absorption force of the car interior sheet, which is finally molded, is degraded, and the size change of the car interior sheet is increased. Accordingly, the content of the thermoplastic resin is preferably in the range of 30-50 weight %.

Therefore, according to the eco-friendly car interior sheet of the present invention, when the composites of the pulverized material of the hygiene product, the additives, the thermoplastic resin, and the composites of the illite are mixed with each other, the pulp has the content of 9-17 weight %, the SAM has the content of 9-17 weight %, the thermoplastic resin has the content of 46 weight %, the additives has the content of 5-15 weight %, and the illite has the content of 1-5 weight %. In other words, when the pulp and the SAM are directly introduced without the pulverized material of the hygiene product, the car interior sheet may be manufactured with composites having the above composition ratios.

A method of manufacturing the car interior sheet using the hygiene product according to the present invention includes a step of classifying hygiene products having a pulp material including plastic and SAP into defective hygiene products and waste hygiene products (S10), a step of crushing the hygiene products to predetermined size (S30), a step of pulverizing the crushed hygiene products in the form of fiber by a pulverizer (S40), a step of transferring the pulverized hygiene products, illite, additives, and thermoplastic resin to a screw conveyer while stirring and mixing the pulverized hygiene products, illite, additives, and thermoplastic resin together (S50), a step of compressing the pulverized hygiene products, illite, additives, and thermoplastic resin together by a compressor after the transferring and stirring step (S50) has been performed (S60), a step of melting the materials compressed in the compressing step (S60) by a melting unit and mixing the materials (S70), a step of primarily performing T-DIE extrusion-molding with respect to the mixture melted in the melting step (S70) after putting the mixture in an extruder (S80), a step of performing secondary molding of forming a base layer of the car interior sheet by pressing the primarily-molded material after passing the primarily-molded material through a calender (S90), and a step of thermally bonding a surface layer onto both surfaces of the molded base layer and cutting the result (S100).

The method of manufacturing the car interior sheet using the hygiene product according to the present invention further includes a neutralizing step of performing the absorption inhibition treatment with respect to the waste hygiene products classified in the classifying step (S10) and cleaning the waste hygiene products before the pulverizing step (S30) is performed (S20)

In detail, according to the classifying step (S10), hygiene products having a pulp material including plastic and SAP are classified into defective hygiene products and waste hygiene products. In the classifying step (S10), although the defective hygiene products and the waste hygiene products are separately collected, foreign substances are removed from the waste hygiene products having foreign substances after being used.

In other words, in the classifying step (S10), the classified defective hygiene products are instantly crushed without removing foreign substances from the defective hygiene products, and the waste hygiene products must be crushed after foreign substances such as sewages have been removed from the waste hygiene products. Accordingly, the hygiene products can be recycled after the hygiene products undergoes the neutralizing step (S20), that is, the step of removing foreign substances from the waste hygiene products.

Next, according to the neutralizing step (S20), it is most preferably that the foreign substances are removed from the waste hygiene products in a dry state without water. In the case of the waste hygiene products, the foreign substances of which are not removed in the dry state, an absorption inhibitor mixture is applied to the waste hygiene products to perform the absorption inhibition treatment for the waste hygiene products in order to prevent SAP contained in the waste hygiene products from absorbing water. Thereafter, water is applied to the waste hygiene products including absorption-inhibited SAP so that sewages are removed from the waste hygiene products.

In this case, a typical absorption inhibitor mixture may be used in the absorption inhibition treatment. Preferably, the absorption inhibitor mixture according to the present invention having the mixture of water and bittern mixed at a predetermined ratio therebetween, or an absorption inhibitor having the mixture of 70-90 weight % of water and 30-10 weight % of calcium chloride may be used. The details thereof has been described and thus will be omitted.

Thereafter, according to the crushing step (S30), hygiene products such as tissues, diapers, or sanitary pads including wet-strength paper made of pulp including plastic or SAP are crushed to predetermined size. The hygiene products are introduced into a hopper or an inlet of a crusher having a crushing impeller having predetermined rotational force and crushed. In this case, the size is a size allowing the crusher to easily crush the hygiene products in the form of fiber, and may be naturally set according to the determination of those skilled in the art.

Then, according to the crushing step (S40) of the present invention, fragments crushed from the crusher are transferred to the conveyer, introduced into the pulverizer, and pulverized in the form of fiber so that the pulverized materials are easily stirred and mixed together with illite, additives, and thermoplastic resin. In this case, naturally, the fragments are pulverized to the size to facilitate the mixing. In addition, pulverized materials, which does not pass through a punching plate when the pulverized materials are transferred, are retrieved and introduced into the pulverizer. The above processes are repeated, so that waste materials may be minimized, and the hygiene products can be pulverized to the size to facilitate the mixing and stirring.

Subsequently, according to the stirring and transferring step (S50) of the present invention, the pulverized material pulverized in the form of fiber, illite, additives, and thermoplastic resin are transferred to the screw conveyer, stirred, and mixed. The pulverized material, which has passed through the punching plate, is stirred and mixed with illite, the additives, and the thermoplastic resin, which are sprayed, and the result is transferred to a compressor.

In this case, the additive is preferably sprayed in size of a solution or a small particle. In addition, the thermoplastic resin and illite are preferably sprayed in the form of stand fiber or in the form of fiber of the pulverized material of the hygiene product. In addition, illite, an additive, and thermoplastic resin are added through a spray scheme. Further, a plurality of illites, additives, and thermoplastic resins are provided at equal intervals along a transfer direction of the mixture, or uniformly distributed and sprayed in a spiral direction at equal divided points of the circumference of a cylinder. In addition, it is natural that additives and thermoplastic resins are uniformly sprayed at positions offset from each other.

Then, according to the compressing step (S60) of the present invention, after the pulverized material of the hygiene product, the additive, and the thermoplastic resin are mixed and stirred together, the pulverized material of the hygiene product, the additive, and the thermoplastic resin are transferred to the compressor through the screw conveyer and compressed to predetermined size. The composites of the base layer of the car interior sheet are stirred and mixed together so that the composites are not separated from each other due to specific gravity or density, but maintained in a mixed state. Accordingly, the melting work in the melting unit, which is described later, can be easily performed.

Thereafter, according to the melting step (step S70) of the present invention, the materials compressed to predetermined size in the compressing step (S60) are introduced into a melting unit and melted. The pulverized material, the additive, and the thermoplastic resin can be easily combined with each other.

Thereafter, according to the primary molding step (step S80), the mixture melted in the melting step (step S50) is put into the extruder, and the T-DIE extrusion molding is performed with respect to the mixture. The melted mixture is put into the extruder and extruded. Then, the result is overlaid on a member such as a plastic film, a metal film, or a cellophane, and pressed and cooled between a cooling roll and a pressing roll, so that the result and the member are fixed to each other. In this case, a worker may naturally select the T-DIE from among conventional T-DIEs to prevent the characteristic of the primary molding material from being changed depending to the temperature variation of the melted resin and to adjust the thickness of the primary molding material.

Next, according to the secondary molding step (S90) of the present invention, the base layer of the car interior sheet is formed by pressing the primarily-molded material after passing the primarily-molded material through a calender. The extruded material, which is primarily molded, is pressed while passing through the calender assembled with a cast iron roll mounted in parallel thereto, so that significantly thin sheets having a constant thickness can be continuously molded at a high speed. In other words, the thin sheet having a constant thickness is molded, thereby obtaining a molded product having the minimized thickness and dimensional change of the base layer provided in the car interior sheet. In this case, it is natural that a worker select and use one among typical calenders.

Next, according to the cutting step (S100), the surface layer is thermally bonded to both surfaces of the molded base layer, and the result is cut to the shape and size according to the type of the car interior sheet. The used surface layer preferably includes one of a polyvinylchloride (PVC) film, polyethlene foam, and nonwoven paper. According to the present invention, the surface layer preferably includes nonwoven paper. Accordingly, the car interior sheet according to the present invention containing the pulp and the SAP absorbs moisture and the surface area of the car interior sheet is widened, so that the foreign substances can be easily discharged.

Hereinafter, exemplary embodiments for a method of fabricating the car interior sheet by using the hygiene product according to the present invention will be described, and tables of tests on the thickness, the weight, the tensile strength, and the impact resistance of the car interior sheet fabricated according to the embodiment will be shown.

Embodiment 1

1. Diapers determined as being defected in the manufacturing of the diapers are collected and crushed to predetermined size.
2. The crushed fragments are introduced into the pulverizer, and pulverized in the form of fiber. The pulverized material, which has passed through the punching plate, is transferred to the screw conveyer and stirred and mixed together with illite, wax, DOP, and PE and PP resins while being transferred to the compressor. In this case, composites including 30-50 weight % of the pulverized material, 5-15 weight % of additives, 30-50 weight % of PE and PP resins, and 1-5 weight % are mixed with each other.
3. The composites transferred to the compressor are compressed to predetermined size, transferred into the melting unit, and melted for the mixing thereof.
4. The melted mixture is put into the extruder and extruded by using a T-DIE to perform a primary-molding process. The molded material subject to the primary-molding process is pressed while passing through the calender, so that the base layer of the car interior sheet is formed.
5. The nonwoven fabric is attached to both sides of the base layer through the thermal bonding and cut according to shapes and sizes.

Embodiment 2

1. After collecting used diapers that have been discarded, the used diapers are subject to the absorption inhibition treatment and cleaned. In this case, when the diapers are cleansed by using water, the diapers are dried and crushed to predetermined size.
2. The crushed fragments are introduced into the pulverizer, and pulverized in the form of fiber. The pulverized material, which has passed through the punching plate, is transferred to the screw conveyer and stirred and mixed together with illite, wax, DOP, and PE and PP resins while being transferred to the compressor. In this case, composites including 30-50 weight % of the pulverized material, 5-15 weight % of additives, 30-50 weight % of PE and PP resins, and 1-5 weight % are mixed with each other.
3. The composites transferred to the compressor are compressed to predetermined size, transferred into the melting unit, and melted for the mixing thereof.

4. The melted mixture is put into the extruder and extruded by using a T-DIE to perform a primary-molding process. The molded material subject to the primary-molding process is pressed while passing through the calender, so that the base layer of the car interior sheet is formed.

5. The nonwoven fabric is attached to both sides of the base layer through the thermal bonding and cut according to shapes and sizes.

TABLE 1

Test Agency: FITI Testing & Research Institute
Test method: in compliance with Internal Standard of HYUNDAI MOTOR COMPANY
Test Results

| | Test Item | Method | Test Result | | Test Standards | |
|---|---|---|---|---|---|---|
| | | | | | TYPE A | TYPE B |
| 1 | Thickness | MS361-15 | | 2.39 MM | acording to drawing specifications | |
| 2 | Specific gravity | MS361-15 | | 1.06 | 0.74 ± 0.03 | 0.83 ± 0.03 |
| 3 | Tensile strength | MS361-15 | state | MD: 6.9 Mpa AMD: 6.1 Mpa | MD: at least 42.6 MPa AMD: at leas 23.0 MPa | MD at least 48.0 MPa AMD: at least 32.8 MPa |
| | | | moisture tolerance | MD: 6.7 Mpa AMD: 6.1 Mpa | MD: at least 39.7 Mpa AMD: at leas 22.5 MPa | MD: at least 41.7 MPa AMD: 31.4 MPa |
| | Elongation percentage | MS361-15 | state | MD: 2.0% AMD: 1.8% | MD: at least 5% AMD: at least 5% | |
| | | | moisture tolerance | MD: 2.0% AMD: 2.1% | MD: at least 5% AMD: at least 5% | |
| 4 | Flexural strength | MS361-15 | state | MD: 4.9 MPa AMD: 2.7 MPa | MD: at least 34.8 MPa AMD: at leas 21.1 MPa | MD: at least 43.6 MPa AMD: 37.7 MPa |
| | | | moisture tolerance | MD: 4.7 MPa AMD: 2.6 MPa | MD: at least 25.0 MPa AMD: at leas 22.5 Mpa | MD: at least 34.8 Mpa AMD: 30.4 Mpa |
| 5 | VICAT | MS361-15 | | 129° C. | at least 166° C. | |
| 6 | Dimensional change | MS361-15 | heat resitant moisture tolerance | MD: −0.15% AMD: −00.1% MD: −0.1% AMD: −0.2% | MD: ±3% AMD: ±3% | |
| 7 | Impact Resistance | MS361-15 | high temp. low temp. | No cracks No cracks | None must be cracked | |
| 8 | Absorption | MS361-15 | | 17.7% | at most 25% | at most 20% |
| 9 | Immersion | MS361-15 | | 1.5 | at least 10% | |
| 10 | Combustibility | MS300-08 | | standard mitigation (see attachments) | 80 mm/min, or 50 mm or more must be not combusted and extinguished. | |
| 11 | Smell | MS300-34 | | dry: 3.0 grades wet: 2.0 grades | at least 3 grades (1-3 grades) | |
| 12 | Environment hazardous substance | MS201-02 | Pb Hg Cd Cr(VI) | not-detected not-detected not-detected not-detected | Pb: 900 mg/kg or less Hg: 900 mg/kg or less Cd: 90 mg/kg or less Cr(VI): 900 mg/kg or less | |

Results

As shown in Table 1, the car interior sheet according to the present invention manufactured in Embodiments 1 and 2 has a thin thickness and less specific gravity and represents superior tensile strength, elongation percentage, flexural strength, VICAT, dimensional change, impact, absorption, and immersion. In addition, the car interior sheet represents low combustibility without flame retardant resin and four heavy metals (lead, mercury, cadmium, and hexavalent chromium), which are environmental hazardous substances, are not generated from the car interior sheet.

Although the present invention has been described by making reference to the embodiments and accompanying drawings, it should be understood that the present invention is not limited to the embodiments but includes all modifications, equivalents and alternatives. Accordingly, those skilled in the art should understand the spirit and scope of the present invention as defined in the following claims. In addition, those skilled in the art should understand that the equivalents and the modifications belong to the scope of the spirit of the present invention.

What is claimed is:

1. A car interior sheet manufactured by using a hygiene product, the car interior sheet comprising:
   a base layer; and
   surface layers attached to both surfaces of the base layer,
   wherein the base layer includes 30-50 weight % of a pulverized material of the hygiene product, 5-15 weight % of additives, and 30-50 weight % of a thermoplastic resin, and 1-5 weight % of illite,
   the pulverized material of the hygiene product includes 20-35 weight parts of pulp, 20-35 weight parts of super absorbent polymer (SAP), and 30-35 weight parts of PP and PE based on 100 weight parts of the pulverized material of the hygiene product, the illite has an average particle size of 1000 meshes, and the additives include one of a wax, a plasticizer, and a cooking oil.

2. The car interior sheet of claim 1, wherein the thermoplastic resin includes at least one of poly vinyl chloride (PVC) resin, polystyrene (PS) resin, polyethylene (PE) resin, polypropylene (PP) resin, acrylic resin, and polyamide resin.

3. The car interior sheet of claim 1, wherein the wax includes at least one of polyethylene (PE) wax, polypropylene (PP) wax, and amid wax.

4. The car interior sheet of claim 1, wherein the plasticizer includes one of dioctyl phthalate (DOE), diisononyl phthalate (DJNP), dioctyl adipate (DOA), trioctyl trimellitate (TOTM), and tricresyl phosphate (TCP).

5. A method of manufacturing a car interior sheet by using a hygiene product, the method comprising:
classifying hygiene products having a pulp material including plastic and super absorbent polymer (SAP) into a defective hygiene product and a waste hygiene product;
neutralizing the waste hygiene product by performing an absorption inhibition treatment for the waste hygiene product and cleaning the waste hygiene product;
crushing the hygiene product to predetermined size;
pulverizing the crushed hygiene product in a form of fiber by a pulverizer;
transferring the pulverized hygiene product, illite powders, additives, and thermoplastic resin together to a screw conveyer while stirring and mixing the pulverized hygiene product, the illite powders, the additives, and the thermoplastic resin together; and
compressing the pulverized hygiene product, the illite powders, the additives, and the thermoplastic resin by a compressor after the transferring, stirring, and mixing of the pulverized hygiene product, illite powders, additives, and thermoplastic resin;
melting the materials, which has been compressed, by a melting unit and mixing the materials;
primarily extrusion-molding the melted mixture by using a T-DIE extruder;
performing a secondary molding process of forming a base layer of the car interior sheet by pressing the primarily-molded material after passing the primarily-molded material through a calendar; and
thermally bonding a surface layer onto both surfaces of the molded base layer and cutting the result.

* * * * *